United States Patent
Morii

(10) Patent No.: US 10,571,238 B2
(45) Date of Patent: Feb. 25, 2020

(54) DETECTOR FOR SURFACE MEASURING DEVICE

(71) Applicant: Tokyo Seimitsu Co., Ltd., Tokyo (JP)

(72) Inventor: Hideki Morii, Tokyo (JP)

(73) Assignee: Tokyo Seimitsu Co., Ltd., Tokyo (JP)

(*) Notice: Subject to any disclaimer, the term of this patent is extended or adjusted under 35 U.S.C. 154(b) by 0 days.

(21) Appl. No.: 16/535,936

(22) Filed: Aug. 8, 2019

(65) Prior Publication Data

US 2019/0360793 A1 Nov. 28, 2019

Related U.S. Application Data

(63) Continuation of application No. PCT/JP2018/005059, filed on Feb. 14, 2018.

(30) Foreign Application Priority Data

Feb. 24, 2017 (JP) ................................. 2017-033572

(51) Int. Cl.
*G01B 5/28* (2006.01)
*G01B 5/20* (2006.01)

(52) U.S. Cl.
CPC ..................... *G01B 5/20* (2013.01); *G01B 5/28* (2013.01)

(58) Field of Classification Search
CPC ........................................................ G01B 5/28
USPC ................................................... 33/533, 551
See application file for complete search history.

(56) References Cited

U.S. PATENT DOCUMENTS

| 2,361,788 | A | * | 10/1944 | Neff | G01B 7/34 |
| | | | | | 73/105 |
| 2,404,143 | A | * | 7/1946 | Reason | G01B 7/34 |
| | | | | | 73/105 |
| 3,019,639 | A | * | 2/1962 | Staples | G01B 5/28 |
| | | | | | 73/105 |
| 4,574,625 | A | | 3/1986 | Olasz et al. | |

(Continued)

FOREIGN PATENT DOCUMENTS

| JP | 06-258003 A | 9/1994 |
| JP | 2004-007437 A | 3/2004 |

(Continued)

OTHER PUBLICATIONS

Tokyo Seimitsu Co, Written Opinion of the International Searching Authority, PCT/JP2018/005059, dated May 1, 2018, 6 pgs.

*Primary Examiner* — George B Bennett
(74) *Attorney, Agent, or Firm* — Morgan, Lewis & Bockius LLP

(57) ABSTRACT

The detector for a surface measuring device includes: an arm including a contact at a tip end of the arm; a rotation shaft configured to rotatably support the arm; a transmission part having one end connected to the arm at a position on a side opposite to the contact with respect to the rotation shaft; an elastic part having one end connected to another end of the transmission part and configured to generate a measuring force to be applied to the contact; a position adjusting part connected to another end of the elastic part and configured to move a position of the another end of the elastic part in a moving direction; and a tilt adjusting part connected to the arm and including a contact part arranged at position where the contact part can be brought into contact with the transmission part.

9 Claims, 9 Drawing Sheets

(56) References Cited

U.S. PATENT DOCUMENTS

| | | | | |
|---|---|---|---|---|
| 5,272,913 A * | 12/1993 | Toda | .................. | B82Y 35/00 |
| | | | | 73/105 |
| 5,847,270 A * | 12/1998 | Nettleton | ............... | G01B 5/012 |
| | | | | 73/105 |
| 6,047,479 A * | 4/2000 | Galestien | ............... | G01B 5/204 |
| | | | | 33/546 |
| 6,295,866 B1 * | 10/2001 | Yamamoto | ............. | G01B 3/008 |
| | | | | 33/501.04 |
| 2009/0300930 A1 * | 12/2009 | Ishikawa | .................. | G01B 5/20 |
| | | | | 33/559 |
| 2014/0283402 A1 * | 9/2014 | Hidaka | .................... | G01B 5/20 |
| | | | | 33/556 |
| 2015/0292851 A1 | 10/2015 | Yamamoto et al. | | |
| 2017/0234670 A1 * | 8/2017 | Fernando | ................. | G01B 5/28 |
| | | | | 33/503 |
| 2018/0372470 A1 * | 12/2018 | Rudkowski | ............ | G01B 3/008 |
| 2019/0101371 A1 * | 4/2019 | Steuer | ...................... | G01B 5/20 |

FOREIGN PATENT DOCUMENTS

| | | |
|---|---|---|
| JP | 2008-180587 A | 8/2008 |
| JP | 2015-200589 A | 11/2015 |

* cited by examiner

DETECTOR FOR SURFACE MEASURING DEVICE

CROSS-REFERENCE TO RELATED APPLICATIONS

The present application is a Continuation of PCT International Application No. PCT/JP2018/005059 filed on Feb. 14, 2018, which claims priority under 35 U.S.C § 119(a) to Japanese Patent Application No. 2017-033572 filed on Feb. 24, 2017. Each of the above applications is hereby expressly incorporated by reference, in its entirety, into the present application.

BACKGROUND OF THE INVENTION

1. Field of the Invention

The present invention relates to a detector to be applied to a surface measuring device configured to measure a surface of an object to be measured.

2. Description of the Related Art

A surface property measuring device has been known as a surface measuring device configured to measure a shape and roughness of a surface of an object to be measured. A lever-type detector has been widely used in a detector for contact-type surface property measurement which is configured to be brought into contact with the surface of the object to be measured. In the lever-type detector, an elastic body such as a coil spring has been widely used as means for imparting a measuring force which brings the contact into abutment against an object to be measured.

In general, bouncing of the arm can be suppressed by increasing the measuring force to some extent, so that displacement of a surface of an object to be measured can be measured with high accuracy.

In Patent Literature 1, there is described a detector for a surface property measuring device, which is configured to rotatably support an arm including a stylus and to generate a measuring force in the stylus using a biasing force of a coil spring. In the detector for a surface property measuring device described in Patent Literature 1, the coil spring is provided in parallel to the axis of the arm. With this configuration, downsizing of the detector for a surface property measuring device is achieved.

Further, the detector for a surface property measuring device described in Patent Literature 1 includes a holding member to which another end of the coil spring is fixed, and an eccentric pin configured to move the holding member in parallel to the axis of the arm. Through rotation of the eccentric pin, the coil spring is moved in parallel to the axis of the arm. With this configuration, a measuring force generated in the arm is proportional to the amount of the movement of the holding member, and the relationship between the amount of adjustment of the eccentric pin and the measuring force is approximated to a liner relationship.

CITATION LIST

Patent Literature 1: Japanese Patent Application Laid-Open No. 2004-077437

SUMMARY OF THE INVENTION

However, when an object to be measured is an easily deformable object such as a soft object, a small object, and a thin object, it is required to adjust and reduce a measuring force to avoid deformation of the object to be measured. Further, in order to facilitate adjustment within a range of a small measuring force, it is required to make adjustment resolution of the measuring force fine (high) so as to enable fine adjustment of the measuring force.

In the detector for a surface property measuring device described in Patent Literature 1, when the measuring force is adjusted linearly with respect to input at the time of adjustment of the measuring force, if the adjustment resolution is made fine (high) within the range of a small measuring force, the adjustment resolution in the entire adjustment range becomes fine (high). As a result, the maximum value of the measuring force becomes small, and the adjustment range of the measuring force becomes narrow. Therefore, it is difficult to obtain the maximum measuring force of a required value.

On the other hand, if the adjustment range is extended in order to obtain the required maximum value of the measuring force, the adjustment resolution becomes rough in the entire adjustment range of the measuring force, so that fine adjustment of the measuring force becomes difficult. That is, it is difficult to establish both of adjustment of measuring force with high resolution in an arbitrary adjustment range and acquirement of large maximum measurement force.

The present invention has been made in view of such circumstances, and aims to provide a detector for a surface measuring device which can attain both of adjustment of a measuring force with high resolution in an arbitrary adjustment range and acquirement of a large maximum measurement force.

In order to attain the above-mentioned object, the following invention modes are provided.

According to a first mode, there is provided a detector for a surface measuring device, including: an arm including a contact at a tip end of the arm; a rotation shaft configured to rotatably support the arm; a transmission part having one end which is connected to the arm at a position on a side opposite to the contact, with respect to the rotation shaft; an elastic part having one end connected to another end of the transmission part, the elastic part configured to generate a measuring force to be applied to the contact; a position adjusting part connected to another end of the elastic part, the position adjusting part configured to move a position of the another end of the elastic part in a moving direction having components of a first direction being a longitudinal direction of the arm and a third direction orthogonal to a second direction being a direction of the rotation shaft; and a tilt adjusting part connected to the arm, the tilt adjusting part including a contact part arranged at a position where the contact part can be brought into contact with the transmission part when the position of the another end of the elastic part is moved in the moving direction.

According to the first mode, the inclination of the measuring force when the transmission part and the contact part are brought into contact with each other is increased, compared to the inclination of the low measuring force when the transmission part and the contact part are not brought into contact with each other. When the transmission part and the contact part are not brought into contact with each other, the adjustment resolution of the measuring force is fine (high). When the transmission part and the contact part are brought into contact with each other, the large maximum measurement force is obtained. Therefore, it is possible to attain both of high adjustment resolution in the range of the low measuring force and large maximum measurement force.

The contact may include a stylus configured to be brought into contact with a measuring position on the object to be measured.

The elastic part may include an elastic body. As an example of the elastic body, a spring is given.

As a configuration example of the contact part, a mode in which the base end is connected to the arm and the contact part is arranged on the tip end, may be given.

According to a second mode, in the detector for a surface measuring device of the first mode, the transmission part may be configured to be a member having non-elasticity or a member having an elastic modulus smaller than an elastic modulus of the elastic part.

With the second mode, the elastic force generated by the elastic part can be transmitted to the arm through the transmission part.

According to a third mode, in the detector for a surface measuring device according to the first mode or the second mode, the transmission part may be configured to be bent when the position of the another end of the elastic part is moved in the moving direction in a state in which the transmission part is brought into contact with the contact part, and to be not bent in a state in which the transmission part is not brought into contact with the contact part.

With the third mode, the transmission part can be switched between the bent state of being brought into contact with the contact part and a non-bent state of not being brought into contact with the contact part.

As an example of the transmission part in the second mode and the third mode, a steel wire using a metal material may be given.

According to a fourth mode, in the detector for a surface measuring device of any one of the first mode to the third mode, the contact part may be configured to be arranged at a position which is separated from a connecting position connecting the arm to the transmission part in the first direction by a certain distance, and separated from a position of the arm in the third direction by a certain distance.

With the fourth mode, it is possible to change the inclination of the measuring force by moving the another end of the elastic part by a certain distance in the third direction.

According to a fifth mode, the detector for a surface measuring device of any one of the first mode to the fourth mode, may be configured to include a plurality of the contact parts which differ in position in the first direction and position in the third direction, from each other.

With the fifth mode, it is possible to adjust the measuring force using two more kinds of inclination of the measuring force.

According to a sixth mode, in the detector for a surface measuring device of any one of the first mode to the fifth mode, the contact part may be configured to include a curved surface which extends along the first direction and has an arbitrary shape with displacement in the third direction.

With the sixth mode, the inclination of the measuring force can be changed continuously.

According to a seventh mode, in the detector for a surface measuring device of any one of the first mode to the sixth mode, the contact part may be configured to be arranged at a position on a side opposite to the rotation shaft as viewed from the connecting position connecting the arm to the transmission part (the side opposite to the rotation shaft with respect to the connecting position connecting the arm to the transmission part), in the first direction.

With the seventh mode, it is possible to suppress reduction of torque acting on the arm.

According to an eighth mode, in the detector for a surface measuring device of any one of the first mode to the sixth mode, the contact part may be configured to be arranged at a position on the rotation shaft side as viewed from the connecting position connecting the arm to the transmission part (the same side as the rotation shaft with respect to the connecting position connecting the arm to the transmission part), in the first direction.

With the eighth mode, it is possible to adjust a measuring force which is flat with respect to displacement of the measuring force adjusting position.

According to a ninth mode, the detector for a surface measuring device of any one of the first mode to the sixth mode, may be configured to further include a detection unit configured to detect displacement of the another end side of the arm in the third direction.

With the ninth mode, it is possible to adjust the measuring force based on the displacement of the another end side of the arm in the third direction.

According to the present invention, the inclination of the measuring force when the transmission part and the contact part are brought into contact with each other is increased, compared to the inclination of the low measuring force when the transmission part and the contact part are not brought into contact with each other. When the transmission part and the contact part are not brought into contact with each other, the adjustment resolution of the measuring force is fine (high), and when the transmission part and the contact part are brought into contact with each other, the high maximum measurement force can be obtained. Therefore, both of high adjustment resolution in the range of the low measuring force and the large maximum measurement force can be attained.

DESCRIPTION OF EMBODIMENTS

Figure 1:
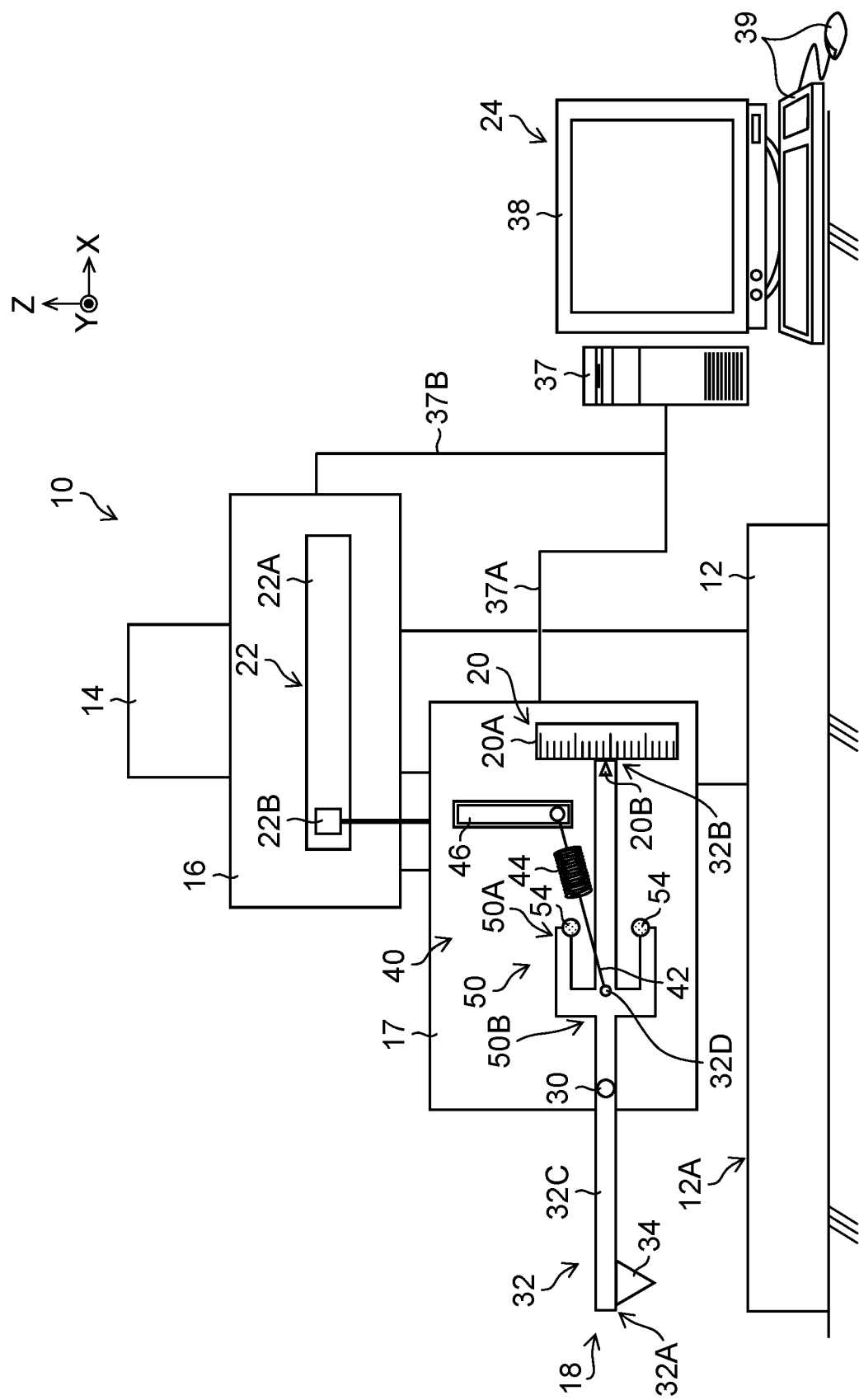
FIG. 1 is an overall configuration diagram illustrating a surface shape measuring device.

Hereinafter, preferred embodiments of the present invention are described with reference to the accompanying drawings. Configurations which are the same as configurations described previously are herein denoted by the same reference numerals, and the description is omitted as appropriate.

<Overall Structure of Surface Shape Measuring Device>

FIG. 1 is an overall configuration diagram illustrating a surface shape measuring device. The direction of the arrow line representing the X-axis direction in FIG. 1 is defined as a positive direction of the X-axis direction. The direction opposite to the direction of the arrow line representing the X-axis direction is defined as a negative direction of the X-axis direction.

Further, the direction of the arrow line representing the Z-axis direction is defined as an upward direction of the Z-axis direction. The direction opposite to the direction of the arrow line representing the Z-axis direction is defined as a downward direction of the Z-axis direction. The direction penetrating the drawing sheet of FIG. 1 from the rear surface to the front surface is defined as a positive direction of the Y-axis direction.

The direction penetrating the drawing sheet of FIG. 1 from the front surface to the rear surface is defined as a negative direction of the Y-axis direction. Here, the X-axis direction collectively encompasses the positive direction of the X-axis direction and the negative direction of the X-axis direction. This similarly applies to the Y-axis direction and the Z-axis direction.

The surface shape measuring device is one mode of a surface measuring device. The X-axis direction corresponds to a first direction being a longitudinal direction of an arm. The Y-axis direction corresponds to a second direction. The Z-axis direction corresponds to a third direction orthogonal to the first direction and the second direction.

A surface shape measuring device 10 includes a flat plate-shaped measuring table 12, a column 14, a feeding device (feeder) 16, a detector 17, and a computer 24. The detector 17 is one mode of a detector for a surface measuring device.

Figure 2:
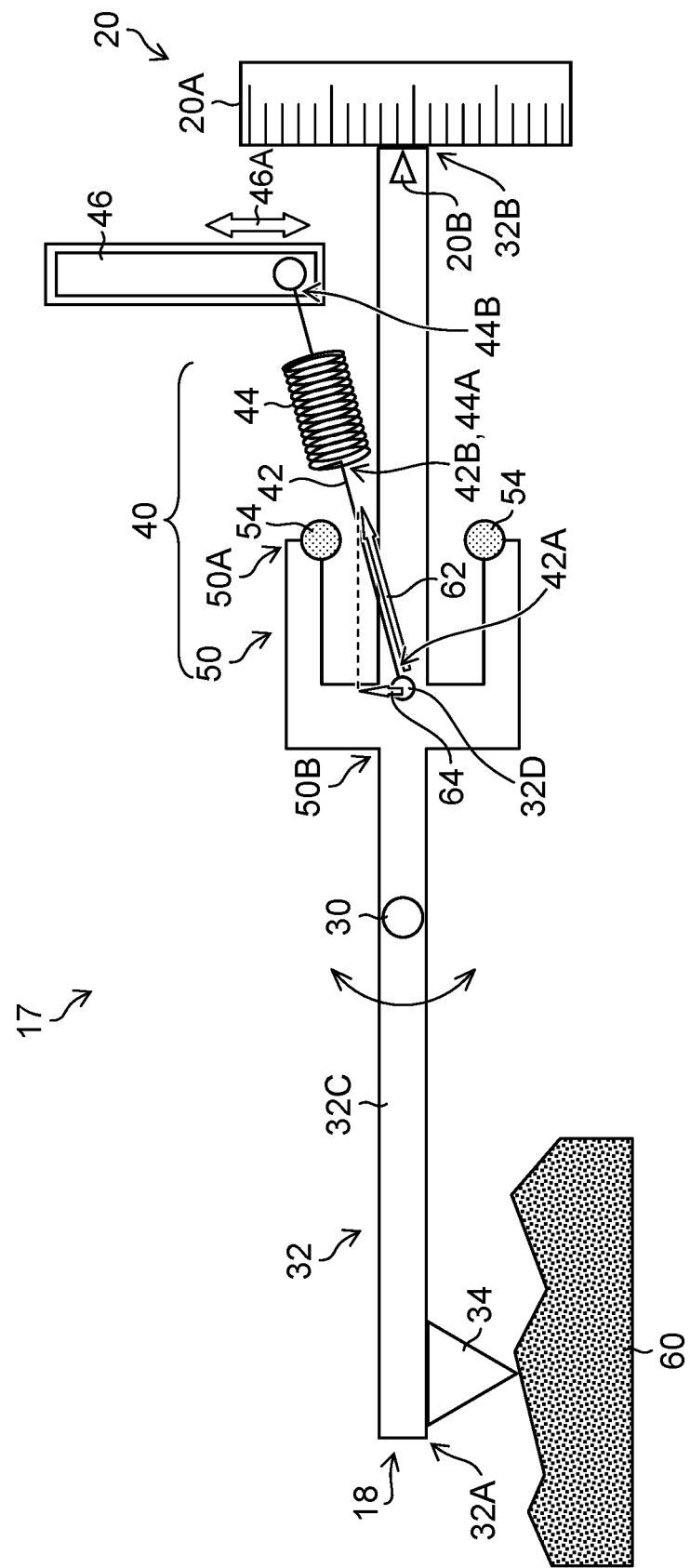
FIG. 2 is a schematic configuration diagram illustrating a lever-type detector.

An object to be measured is set on an upper surface 12A of the measuring table 12. In FIG. 1, illustration of the object to be measured is omitted. The object to be measured is illustrated in FIG. 2 as being designated by Reference numeral 60. The column 14 which extends in the Z-axis direction is erected vertically on the upper surface 12A of the measuring table 12. The feeding device 16 is mounted to the column 14 so as to be freely movable upward and downward in the Z-axis direction. The detector 17 is mounted to the feeding device 16 so as to be freely movable in the X-axis direction.

Illustration of a Z-axis direction moving unit configured to move the feeding device 16 upward and downward in the Z-axis direction, and an X-axis direction moving unit configured to move the detector 17 in the X-axis direction is omitted.

The feeding device 16 includes an X-axis direction detection sensor 22. The X-axis direction detection sensor 22 includes a linear scale 22A and a read head 22B. The linear scale 22A is arranged along the X-axis direction. The read head 22B is configured to be movable integrally with the detector 17 in the X-axis direction. The X-axis direction detection sensor 22 detects displacement of the detector 17 in the X direction.

The read head 22B reads a value of the linear scale 22A. The value of the linear scale 22A represents displacement of the detector 17 in the X direction. The read head 22B sends the read value of the linear scale 22A to the computer 24. The read head 22B may be an optical type or a magnetic type.

The detector 17 includes a stylus 18 and a Z-axis direction detection sensor 20. The stylus 18 includes an arm 32 and a contact 34. The contact 34 is mounted to a tip end 32A of the arm 32. The rotation shaft 30 extends along the Y-axis direction, and the arm 32 is supported so as to be rotatable about the Y-axis, with a rotation shaft 30 as a fulcrum. The rotation direction of the arm 32 at the position of the rotation shaft 30 is illustrated with the curved line having the arrow marks in FIG. 2.

The Z-axis direction detection sensor 20 includes a scale 20A and a read head 20B. The scale 20A has a shape along the rotational trajectory of a base end 32B of the arm 32. The read head 20B is mounted to the base end 32B of the arm 32. The Z-axis direction detection sensor 20 detects displacement of the contact 34 in the Z-axis direction.

The read head 20B reads a value of the scale 20A. The read head 20B may be an optical type or a magnetic type. The read head 20B sends the read value of the scale 20A to the computer 24. The computer 24 calculates the displacement of the contact 34 in the Z-axis direction using the read value of the scale 20A.

Incidentally, as the Z-axis direction detection sensor 20, there may be used, instead of the scale-type detector or in combination with the scale-type detector, a displacement sensor using any one of a differential-transformer-type sensor, a capacitance-type sensor, and an eddy-current-type sensor.

Example of the displacement sensor include a linear variable differential transformer, a scale, and a laser displacement meter. As an example of the linear variable differential transformer, LVDT may be given. The LVDT is an abbreviation of a linear variable differential transformer. The same applies to the X-axis direction detection sensor 22. The Z-axis direction detection sensor 20 is one mode of the detection unit.

The detector 17 includes a measuring force adjusting unit (measuring force adjuster) 40. The measuring force adjusting unit 40 includes a string-shaped member 42, an elastic member 44, a position adjusting part (position adjuster) 46, and a tilt adjusting part (tilt adjuster) 50. The measuring force adjusting unit 40 adjusts a measuring force applied to the contact 34.

The tilt adjusting part 50 is mounted to the arm 32. The tilt adjusting part 50 is configured so as to be extended from the arm 32 toward the positive direction of the X-axis direction. A tip end 50A of the tilt adjusting part 50 includes contact parts 54. The contact parts 54 are arranged at positions separated from a connecting position 32D where the arm 32 is connected with the string-shaped member 42, by a certain distance in the X-axis direction. The contact parts 54 are arranged at positions separated from the position of the arm 32, by a certain distance in the Z-axis direction.

The contact parts 54 each have a shape in which a surface in contact with the string-shaped member 42 is curved. Examples of the shape of the contact parts 54 include a spherical shape and a cylindrical shape having a certain length in the Y-axis direction. As examples of the material of the contact parts 54, metal and resin may be given.

A base end 50B of the tilt adjusting part 50 is connected to a main body 32C of the arm 32. Details of the measuring force adjusting unit 40, and adjustment of a measuring force using the measuring force adjusting unit 40 are described later.

The computer 24 includes a data processing device (data processor) 37, a monitor 38, an operating unit 39 including a keyboard, a mouse, and the like. The data processing device 37 includes an arithmetic processing unit (calculator) and a storage unit. The computer 24 includes a control unit (controller) (not shown).

The control unit (not shown) performs a program of operating the surface shape measuring device 10, so that the surface shape measuring device 10 is operated to perform measurement of an object to be measured. The control unit may operate the surface shape measuring device 10 based on information input by an operator.

The control unit sends a command signal to operate the X-axis direction moving unit. The X-axis direction moving unit performs movement in the X-axis direction based on the command signal sent from the control unit. The control unit may perform feedback control of the operation of the X-axis direction moving unit using the detection result of the X-axis direction detection sensor 22.

The surface shape measuring device 10 includes a Y-axis direction moving unit (not shown). The control unit sends a command signal to operate the Y-axis direction moving unit. The Y-axis direction moving unit performs movement of the detector 17 in the Y-axis direction based on the command signal sent from the control unit.

The control unit sends a command signal to operate the Z-axis direction moving unit. The Z-axis direction moving unit performs movement in the Z-axis direction based on the command signal sent from the control unit.

The data processing device 37 creates data of a surface shape of an object to be measured based on the detection result of the Z-axis direction detection sensor 20 and the detection result of the X-axis direction detection sensor 22, with the arithmetic processing unit. The data processing device 37 stores the data of a surface shape of an object to be measured in the storage unit.

Reference numeral 37A in FIG. 1 designates a wiring for electrical connection between the data processing device 37 and the Z-axis direction detection sensor 20. Reference numeral 37B in FIG. 1 designates a wiring for electrical connection between the data processing device 37 and the X-axis direction detection sensor 22.

The arithmetic processing unit includes a processor such as a CPU and a peripheral circuit. As the storage unit, a semiconductor device such as RAM or ROM may be used, or a magnetic storage medium such as a hard disk may be used.

Incidentally, the CPU is an abbreviation of Central Processing Unit. ROM is an abbreviation of Read Only Memory. RAM is an abbreviation of Random Access Memory.

The monitor 38 functions as a display unit configured to display information on the object to be measured, which is generated by the computer 24. The computer 24 may cause the monitor 38 to display the measurement result of the object to be measured.

The operating unit 39 functions as an interface when an operator inputs information to the data processing device 37. The information input using the operating unit 39 is sent to the data processing device 37.

<Measurement Procedure of Surface Shape Measuring Device>

The measurement procedure of the surface shape measuring device 10 illustrated in FIG. 1 is as follows. The measuring force adjusting unit 40 applies a measuring force having a predetermined pressure to the contact 34 to press the contact 34 against a surface of an object to be measured. The contact 34 and the object to be measured are relatively moved along the X-axis direction and the Y-axis direction. The Z-axis direction detection sensor 20 converts displacement of the contact 34 caused by relief (derricking or convexo-convex) of the object to be measured into an electrical signal.

The Z-axis direction detection sensor 20 sends the electrical signal representing the displacement of the contact 34 to the computer 24. The computer 24 associates each displacement amount with each measurement position in the object to be measured based on the electrical signal representing displacement of the contact 34, to create data of the surface shape of the object to be measured.

<Description of Detector>

FIG. 2 is a schematic configuration diagram illustrating a lever-type detector. The detector 17 illustrated in FIG. 2 realizes both of high resolution in small measurement force range and a large maximum measurement force when adjusting the measuring force. The detector 17 is described in detail below.

One end 42A of the string-shaped member 42 illustrated in FIG. 2 is connected to the arm 32. The other end 42B of the string-shaped member 42 is connected to one end 44A of the elastic member 44. The other end 44B of the elastic member 44 is connected to the position adjusting part 46.

The string-shaped member 42 transmits an elastic force generated by the elastic member 44 to the arm 32 to generate a measuring force in the arm 32. The elastic member 44 transmits the elastic force generated by the elastic member 44 to the string-shaped member 42. The string-shaped member 42 is one mode of a transmission part. The elastic member 44 is one mode of an elastic part.

The position adjusting part 46 moves the other end 44B of the elastic member 44 along the upward direction of the Z-axis direction with reference to the position of the arm 32 in the Z-axis direction. Further, the position adjusting part 46 moves the other end 44B of the elastic member 44 along the downward direction of the Z-axis direction with reference to the position of the arm 32 in the Z-axis direction.

The position adjusting part 46 moves the position of the other end 44B of the elastic member 44 in the upward or the downward direction of the Z-axis direction from the position of the arm 32 in the Z-axis direction as the origin position. The position adjusting part 46 functions as an input unit for the measuring force adjusting unit 40. The arrow line with Reference numeral 46A in FIG. 2 represents the moving direction of the other end 44B of the elastic member 44. As a configuration example of the position adjusting part 46, a configuration including a driving force such as a motor and a vertical moving mechanism, may be given.

The position adjusting part 46 may move the position of the other end 44B of the elastic member 44 in the moving direction having the Z-axis direction component.

The detector 17 illustrated in FIG. 2 is in a state of imparting the measuring force directed in the downward direction of the Z-axis direction to the contact 34. The measuring force herein is an arbitrary measuring force within the low measuring force range which will be described later. The arrow line illustrated with Reference numeral 62 in FIG. 2 represents an elastic force generated by the elastic member 44 in the one end 42A of the string-shaped member 42, and the one end 42A is a position where the arm 32 is connected with the string-shaped member 42.

Further, the arrow line illustrated with Reference numeral 64 represents a component which contributes to the measuring force, of the elastic force generated by the elastic member 44 at the one end 42A of the string-shaped member 42. The one end 42A is a position where the arm 32 is connected to the string-shaped member 42.

The component which contributes to a measuring force is a Z-axis direction component of the elastic force. In other words, in the elastic force, the component which contributes to a measuring force is a component force acting in the rotation direction of the arm 32. The measuring force applied to the contact 34 has a magnitude proportional to the magnitude of the Z-axis direction component 64 of the elastic force, and is directed in the downward direction of the Z-axis direction.

In other words, the magnitude of the measuring force is calculated by: multiplying the magnitude of the Z-axis direction component 64 of the elastic force by the distance from the rotation shaft 30 to the connecting position 32D where the arm 32 is connected with the string-shaped member 42; and dividing the value obtained as a result of the multiplication by the distance from the rotation shaft 30 to the contact 34. The connecting position 32D connecting the arm 32 to the string-shaped member 42 may be read as the point of application of the elastic force.

When the position of the other end 44B of the elastic member 44 is moved in the upward direction of the Z direction by the position adjusting part 46, the angle of the elastic force 62 generated by the elastic member 44 with respect to the X-axis direction becomes larger. As a result, the magnitude of the Z-axis direction component 64 of the elastic force also becomes larger. Further, the magnitude of the measuring force also becomes larger.

In this manner, the magnitude of the measuring force applied to the contact 34 can be adjusted by changing the position of the other end 44B of the elastic member 44 with the position adjusting part 46. In the range in which the string-shaped member 42 illustrated in FIG. 2 is not brought into contact with the contact part 54, the measuring force is roughly linearly changed with respect to the position of the other end 44B of the elastic member 44.

FIG. 2 illustrates, as an example, the position adjusting part 46 configured to move the position of the other end 44B of the elastic member 44 in the upward direction of the Z-axis direction, so that the position of the other end 44B becomes higher than the position of the arm 32 in the Z-axis direction. The position adjusting part 46 may move the position of the other end 44B of the elastic member 44 in the downward direction of the Z-axis direction so that the position of the other end 44B becomes lower than the position of the arm 32 in the Z-axis direction. In such a mode, the contact 34 receives the measuring force directed in the upward direction of the Z-axis direction.

The string-shaped member 42 has bendability. The bendability is a property of the string-shaped member 42 and means that the string-shaped member 42 is bent when the string-shaped member 42 is brought into contact with the contact part 54. The string-shaped member 42 having bendability is easily bent when being brought into contact with the contact part 54.

The string-shaped member 42 has flexibility. The flexibility is a property of the string-shaped member 42 and means that the string-shaped member 42 which has been bent becomes non-bent in a state where the string-shaped member 42 becomes in non-contact with the contact part 54. The term "non-bent" herein includes a substantially not-bent state which can be regarded as similar to the state before the string-shaped member 42 is bent although the string-shaped member 42 is bent compared to the state before the bending.

The string-shaped member 42 having flexibility can be easily restored to the original shape before the string-shaped member 42 is bent, in a state in which the bent string-shaped member 42 becomes in non-contact with the contact part 54.

As the string-shaped member 42, a steel wire having non-elasticity can be applied. The string-shaped member 42 having non-elasticity is preferable because variation of the elastic force is small in the string-shaped member 42. The string-shaped member 42 may have an elastic modulus which is less than the elastic modulus of the elastic member 44. As an example of the elastic member 44, a coil spring is given. An elastic body such as a leaf spring or a torsion spring may be applied in place of the coil spring.

The coil spring includes a coil portion and linear portions. The linear portions are provided on both sides of the coil portion. One linear portion is connected to the string-shaped member 42. The other linear portion is connected to the position adjusting part 46.

<Description of Measuring Force Adjustment According to First Embodiment>

Figure 3:
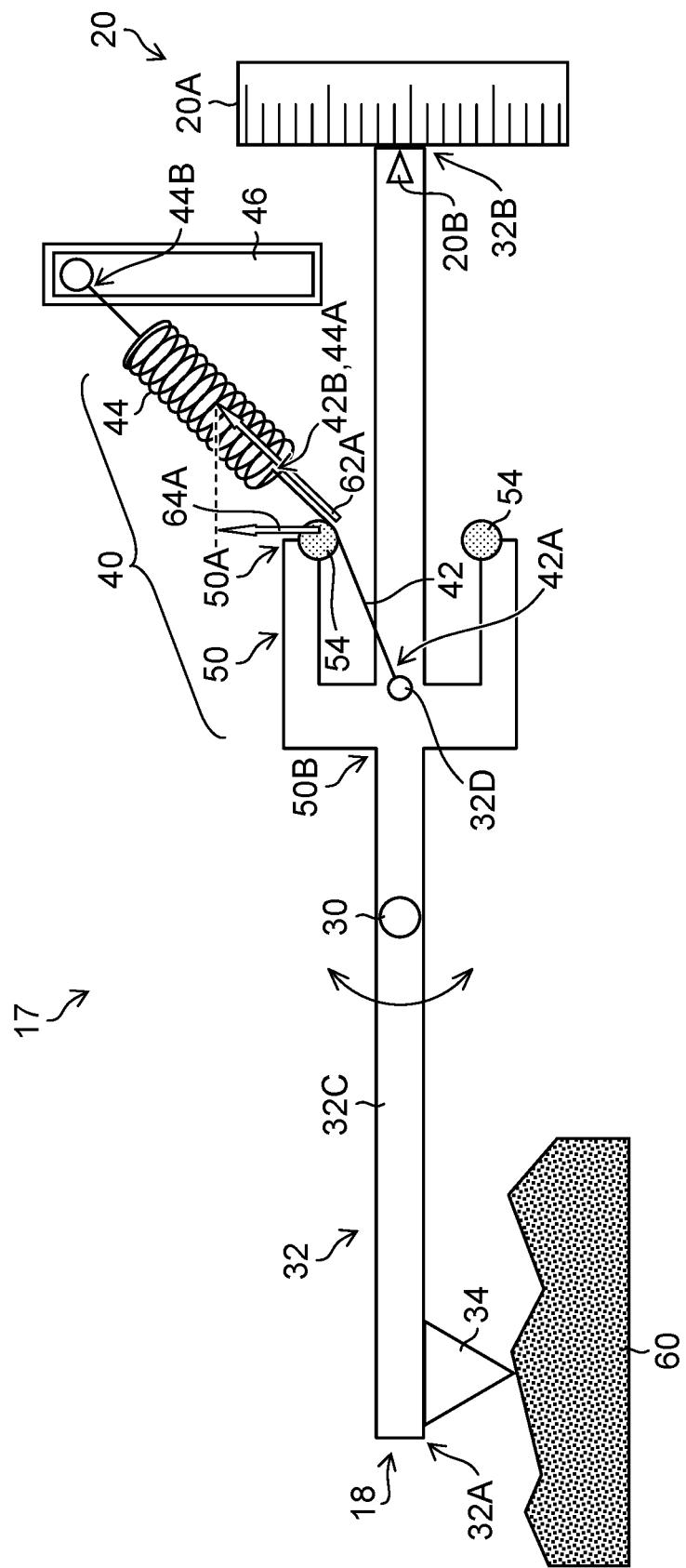
FIG. 3 is a schematic view of measuring force adjustment according to a first embodiment.

FIG. 3 is a schematic view of measuring force adjustment according to a first embodiment. FIG. 3 illustrates a state in which the string-shaped member 42 is brought into contact with the contact part 54. When the position of the other end 44B of the elastic member 44 illustrated in FIG. 2 is further moved in the upward direction of the Z-axis direction, the string-shaped member 42 and the contact part 54 are brought into contact with each other as illustrated in FIG. 3.

Further, when the other end 44B of the elastic member 44 is moved in the upward direction of the Z-axis direction, the string-shaped member 42 is bent at a position where the spring-shaped member 42 is in contact with the contact part 54. After the string-shaped member 42 is bent at the contacting position with the contact part 54, the angle of the elastic member 44 with respect to the X-axis direction becomes larger than the state illustrated in FIG. 2. Further, the point of application of an elastic force 62A generated by the elastic member 44 corresponds to the position of the contact part 54.

When the angle of the elastic member 44 with respect to the X-axis direction becomes relatively larger, the magnitude of a Z-axis direction component 64A of the elastic force becomes equal to or larger than the magnitude of the Z-axis direction component 64 of the elastic force illustrated in FIG. 2. That is, the Z-axis direction component of the elastic force changes non-linearly so that the inclination changes depending on whether or not the string-shaped member 42 is in contact with the contact part 54.

According to the measuring force adjustment illustrated in this embodiment, it is possible to obtain the measuring force which changes non-linearly with respect to the input of the measuring force adjusting unit 40. The input of the measuring force adjusting unit 40 is a distance from the arm 32 to the other end 44B of the elastic member 44 in the Z-axis direction. The input of the measuring force adjusting unit 40 may be defined as the position of the other end 44B of the elastic member 44 in the Z-axis direction when the position of the arm 32 in the Z-axis direction is regarded as the origin position.

Figure 4:
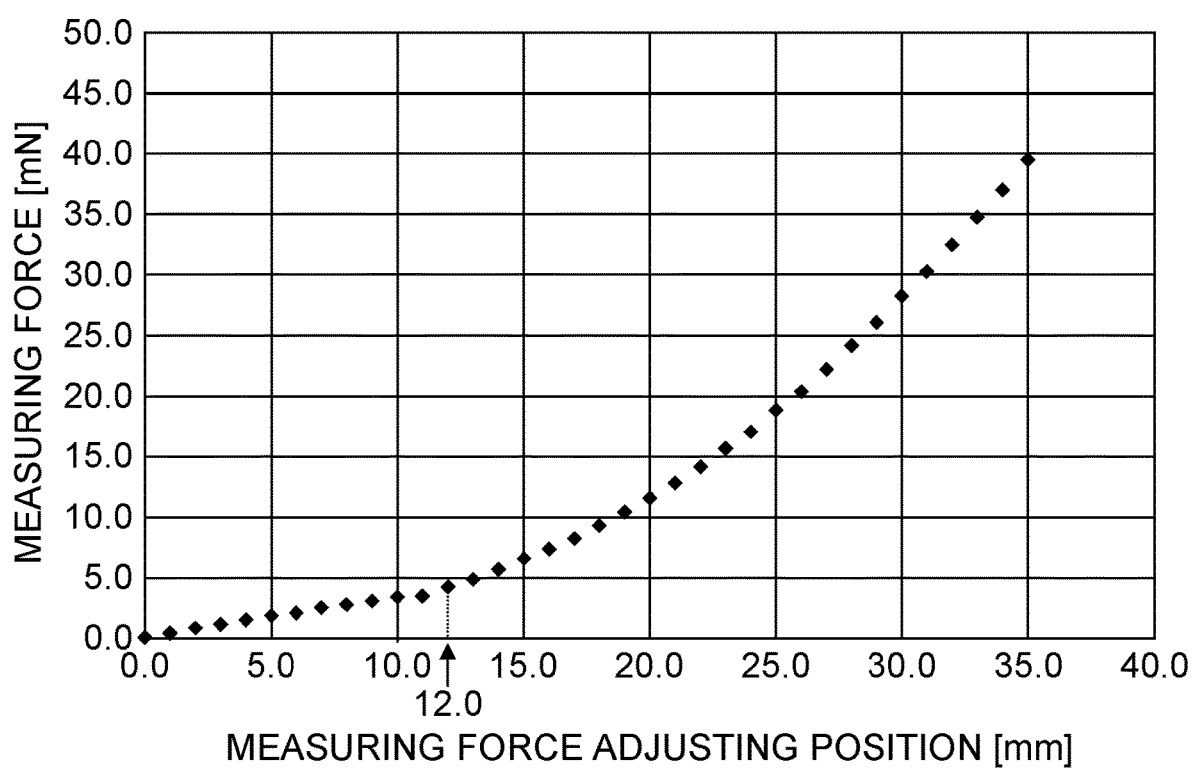
FIG. 4 is a graph for showing a relationship between a measuring force adjusting position and a measuring force in the measuring force adjustment according to the first embodiment.

FIG. 4 is a graph showing a relationship between a measuring force adjusting position and a measuring force in the measuring force adjustment according to the first embodiment. The horizontal axis in FIG. 4 represents the measuring force adjusting position. The measuring force adjusting position corresponds to the distance from the position of the arm 32 to the position of the other end 44B of the elastic member 44 in the upward direction of the Z-axis direction illustrated in FIG. 3. The unit of position is millimeter. The vertical axis in FIG. 4 represents the measuring force applied to the contact 34 illustrated in FIG. 3. The unit of measuring force is milli-Newton (mN).

In the graph shown in FIG. 4, the inclination of the measuring force changes at the measuring force adjusting position of 12.0 millimeters, as the boundary. The inclination of the measuring force corresponds to a value obtained by dividing a value of the measuring force by a value of the measuring force adjusting position. In other words, the inclination of the measuring force corresponds to an amount of change of the measuring force when the measuring force adjusting position is changed per unit length.

As shown in FIG. 4, when the measuring force adjusting position is equal to or smaller than 12.0 millimeters, the change of the measuring force is relatively smaller than the change of the measuring force adjusting position per unit length. In the range in which the measuring force adjusting position is equal to or smaller than 12.0 millimeters, as illustrated in FIG. 2, the string-shaped member 42 is not in contact with the contact part 54.

When the measuring force adjusting position is 12.0 millimeters, the string-shaped member 42 is at the position of being brought into contact with the contact part 54.

When the measuring force adjusting position exceeds 12.0 millimeters, the change of the measuring force is relatively larger than the change of the measuring force adjusting position per unit length. In the range in which the measuring force adjusting position exceeds 12.0 millimeters, as illustrated in FIG. 3, the string-shaped member 42 is brought into contact with the contact part 54, and the angle of the elastic member 44 with respect to the X-axis direction is larger than in the case where the string-shaped member 42 is not in contact with the contact part 54.

In other words, in the range in which the measuring force adjusting position exceeds 12.0 millimeters, the angle affecting the Z-axis direction component of the elastic force steeply changes with respect to the displacement of the other end 44B of the elastic member 44 by the position adjusting part 46. Thus, the change of the measuring force becomes steeper with respect to displacement of the other end 44B of the elastic member 44.

The range in which the measuring force adjusting position is equal to or smaller than 12.0 millimeters corresponds to the range of the low measuring force in which the measuring force is equal to or smaller 5.0 milli-Newton. The range of the low measuring force corresponds to a range in which the measuring force can be finely adjusted, specifically, a range in which the adjustment resolution of the measuring force is high.

Figure 5:
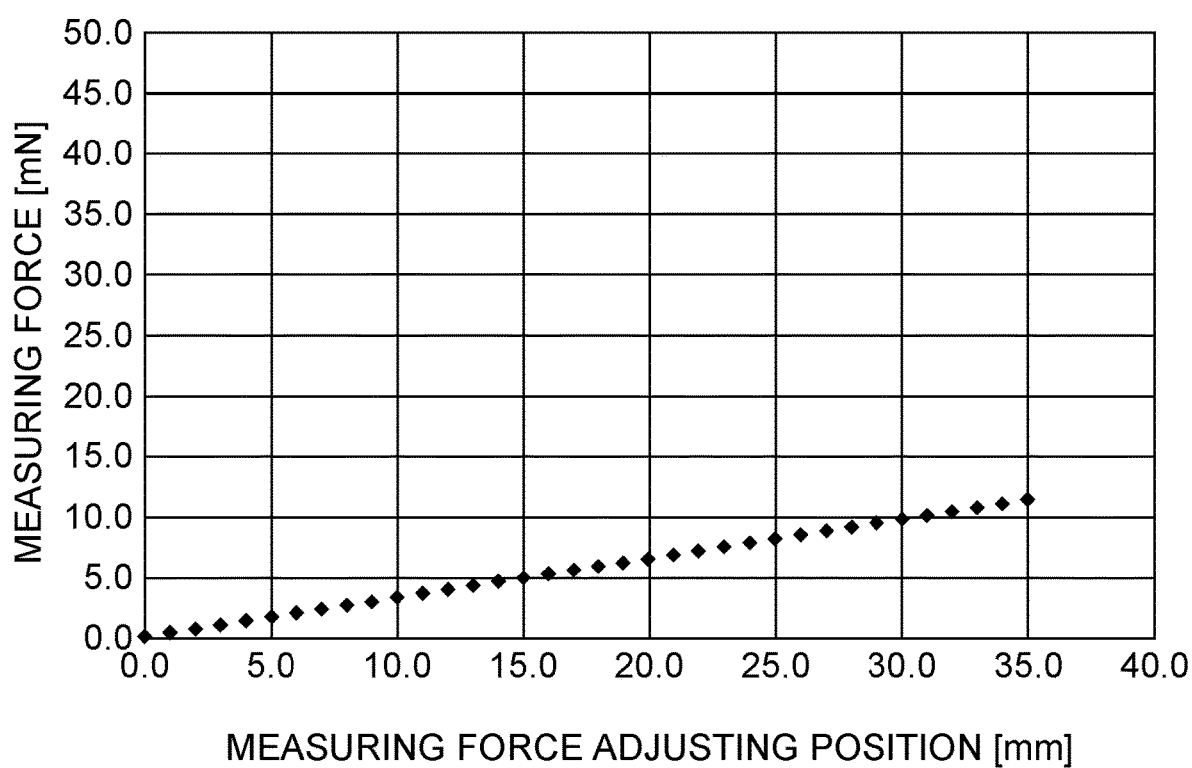
FIG. 5 is a graph for showing a relationship between a measuring force adjusting position and a measuring force according to a comparative example.

FIG. 5 is a graph showing a relationship between a measuring force adjusting position and a measuring force according to a comparative example. FIG. 5 shows a case where the inclination of the measuring force in the range in which the measuring force adjusting position is equal to or smaller than 12.0 millimeters shown in FIG. 4 is applied to the range in which the measuring force adjusting position exceeds 12.0 millimeters. In other words, FIG. 5 shows a case where the tilt adjusting part 50 illustrated in FIG. 3 is not provided.

As shown in FIG. 5, when the adjustment resolution of the measuring force becomes higher, the upper limit value of the measuring force is restricted. In the example shown in FIG. 5, the maximum value of the measuring force is 11.0 milli-Newton. If the elastic modulus of the elastic member 44 illustrated in FIG. 3 is changed, the maximum value of the measuring force can be increased. However, in this case, in the whole area of the measuring force adjusting position, the adjustment resolution of the measuring force becomes rough.

In contrast, as shown in FIG. 4, the maximum measuring force of the detector 17 illustrated in this embodiment is 40 milli-Newton. The inclination of the measuring force in the range in which the measuring force adjusting position exceeds 12.0 millimeters is larger than the inclination of the measuring force in the range in which the measuring force adjusting position is equal to or smaller than 12.0 millimeters. Thus, it is possible to prevent the problem of restriction of the upper limit value of the measuring force.

Further, in the range in which the measuring force adjusting position is equal to or smaller than 12.0 millimeters, higher adjustment resolution of the measuring force is achieved, so that fine adjustment of the measuring force is enabled.

<Functions and Effects of Measuring Force Adjustment According to First Embodiment>

In the measuring force adjustment according to the first embodiment, the measuring force adjusting unit 40 is configured to impart the measuring force to the contact 34. The measuring force adjusting unit 40 includes the string-shaped member 42, the elastic member 44, and the tilt adjusting part 50. The one end 42A of the string-shaped member 42 is attached to the arm 32. The other end 42B of the string-shaped member 42 is connected to the one end 44A of the elastic member 44. The position of the other end 44B of the elastic member 44 is moved in the Z-axis direction.

When the other end 44B of the elastic member 44 is located in the range in which the string-shaped member 42 is not in contact with the contact part 54 at the tip end 50A of the tilt adjusting part 50, the adjustment resolution of the measuring force is high. When the other end 44B of the elastic member 44 is located in the range in which the string-shaped member 42 is brought into contact with the contact part 54 at the tip end 50A of the tilt adjusting part 50, the inclination of the measuring force becomes larger so that the high maximum measurement force can be achieved.

Therefore, both of the high adjustment resolution in the range of the low measuring force and the high maximum measurement force can be attained.

The relationship between the measuring force adjusting position and the measuring force shown in FIG. 4 and FIG. 5 is an example. The measuring force adjusting position and the maximum measuring force can be changed by changing conditions of the elastic modulus of the elastic member 44 and the adjustable range of the position adjusting part 46.

Further, the boundary position of the measuring force adjusting position can be changed by changing the position of the contact part 54 in the Z-axis direction. Further, the angle of the elastic member 44 with respect to the X-axis direction can be changed by changing the position of the contact part 54 in the Z-axis direction.

When the position of the contact part 54 in the Z-axis direction is brought closer to the connecting position 32D connecting the arm 32 to the string-shaped member 42, the angle of the elastic member 44 with respect to the X-axis direction becomes relatively larger. When the position of the contact part 54 in the Z-axis direction is separated from the position 32D connecting the arm 32 to the string-shaped member 42, the angle of the elastic member 44 with respect to the X-axis direction becomes relatively smaller.

When the contact parts 54 are arranged on both sides in the Z-axis direction across the arm 32, the position of the contact part 54 on the upper side of the arm 32 and the position of the contact part 54 on the lower side of the arm 32 may be symmetrical to each other with respect to the arm 32 (the distances from the arm 32 may be the same), or may be different from each other.

In the mode exemplified in the first embodiment, the contact parts 54 and the other end 44B of the elastic member 44 are arranged at the positions on the side opposite to the rotation shaft 30 in the X-axis direction, as viewed from the position 32D connecting the arm 32 to the string-shaped member 42.

The contact parts 54 and the other end 44B of the elastic member 44 may be arranged at the positions on the rotation shaft 30 side in the X-axis direction, as viewed from the position 32D connecting the arm 32 to the string-shaped member 42. The same applies to a second embodiment to be described later.

<Description of Measuring Force Adjustment according to Second Embodiment>

Figure 6:
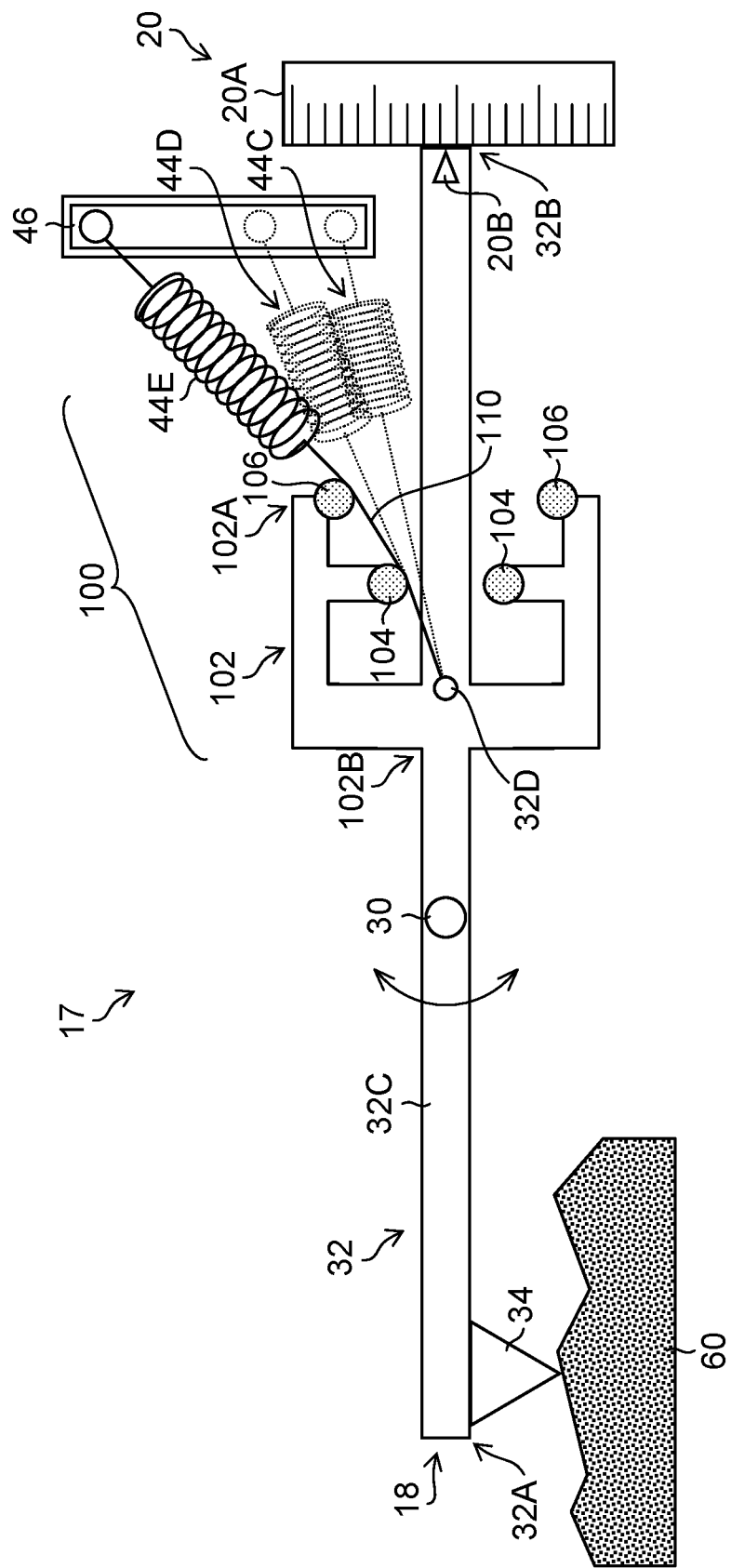
FIG. 6 is a schematic view of measuring force adjustment according to a second embodiment.

FIG. 6 is a schematic view of measuring force adjustment according to the second embodiment. A measuring force adjusting unit 100 illustrated in FIG. 6 includes a tilt adjusting part 102. The tilt adjusting part 102 includes first contact parts 104 and second contact parts 106, each of which are a plurality of contact parts.

The positions of the first contact parts 104 are different from the positions of the second contact parts 106 in the X-axis direction and the Z-axis direction. The position of each of the second contact parts 106 in the X-axis direction is farther from the connecting position 32D connecting the arm 32 to the string-shaped member 110 than the position of each of the first contact parts 104 in the X-axis direction.

The position of each of the second contact parts 106 in the Z-axis direction is farther from the position of the arm 32 in the Z-axis direction than the position of each of the first contact parts 104 in the Z-axis direction. The string-shaped member 110 has a length enough to be brought into contact with both the first contact part 104 and the second contact part 106.

In an elastic member designated by Reference numeral 44C and illustrated with a broken line in FIG. 6, the string-shaped member 110 is not brought into contact with the first contact part 104 and the second contact part 106. In an elastic member designated by Reference numeral 44D and illustrated with a broken line, the string-shaped member 110 is brought into contact with one first contact part 104, and the string-shaped member 110 is not brought into contact with the second contact parts 106. In an elastic member designated by Reference numeral 44E and illustrated with a solid line, the string-shaped member 110 is brought into contact with the first contact part 104 and the second contact part 106.

Reference numeral 102A illustrated in FIG. 6 designates the tip end of the tilt adjusting part 102. Reference numeral 102B designates the base end of the tilt adjusting part 102. The first contact part 104 and the second contact part 106 are one mode of a plurality of contact parts whose positions are different from each other in the first direction and position in the third direction.

Figure 7:
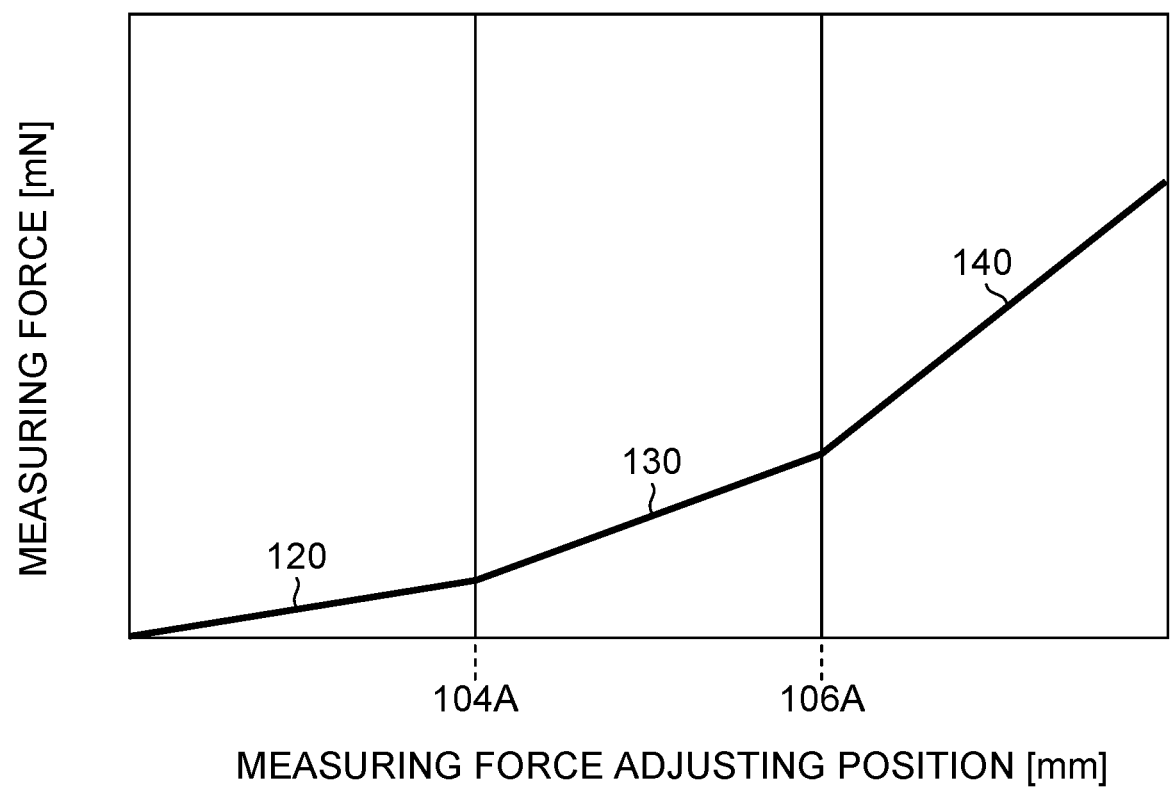
FIG. 7 is a graph for showing a relationship between a measuring force adjusting position and a measuring force in the measuring force adjustment according to the second embodiment.

FIG. 7 is a graph showing a relationship between a measuring force adjusting position and a measuring force in the measuring force adjustment according to the second embodiment. The horizontal axis and the vertical axis in FIG. 7 are the same as those in FIG. 4 and FIG. 5. The measuring force adjusting position designated by Reference numeral 104A in FIG. 7 corresponds to the position of the first contact part 104 in the Z-axis direction illustrated in FIG. 6. The measuring force adjusting position designated by Reference numeral 106A in FIG. 7 corresponds to the position of the second contact part 106 in the Z-axis direction illustrated in FIG. 6.

As shown in FIG. 7, the measuring force adjusting unit 100 illustrated in FIG. 6 can change the inclination of the measuring force in three stages. The measuring force designated by Reference numeral 120 in FIG. 7 corresponds to the range of the measuring force adjusting position when the string-shaped member 110 illustrated in FIG. 6 is not brought into contact with both of the first contact part 104 and the second contact part 106. In this embodiment, the measuring force designated by Reference numeral 120 may be defined as a low measuring force.

The measuring force designated by Reference numeral 130 in FIG. 7 corresponds to the range of the measuring force adjusting position when the string-shaped member 110 illustrated in FIG. 6 is brought into contact with the first contact part 104 and is not brought into contact with the second contact part 106. In this embodiment, the measuring force designated by Reference numeral 130 may be defined as a middle measuring force.

The range of the measuring force adjusting position of the measuring force designated by Reference numeral 140 in FIG. 7 is a range of the measuring force adjusting position when the string-shaped member 110 illustrated in FIG. 6 is brought into contact with the first contact part 104 and the second contact part 106. In this embodiment, the measuring force designated by Reference numeral 140 may be defined as a high measuring force.

<Functions and Effects of Measuring Force Adjustment According to Second Embodiment>

In the measuring force adjustment according to the second embodiment, the measuring force adjusting unit 100 illustrated in FIG. 6 can form a plurality of correlations between the measuring force and displacement of the measuring force adjusting position, using a plurality of inclinations of the elastic member 44 with respect to the X-axis direction. In the example illustrated in FIG. 6, the measuring force adjusting unit 10 can achieve a characteristic having appropriate resolution in the measuring force adjustment in each of the low measuring force, the middle measuring force, and the high measuring force.

In this embodiment, the mode in which the tilt adjusting part includes the two contact parts is exemplified. Three or more contact parts may be provided. Arbitrary positions can be applied as the positions of the plurality of contact parts in accordance with adjustment resolution for the measuring force and the maximum measuring force.

<Description of Measuring Force Adjustment According to Third Embodiment>

Figure 8:
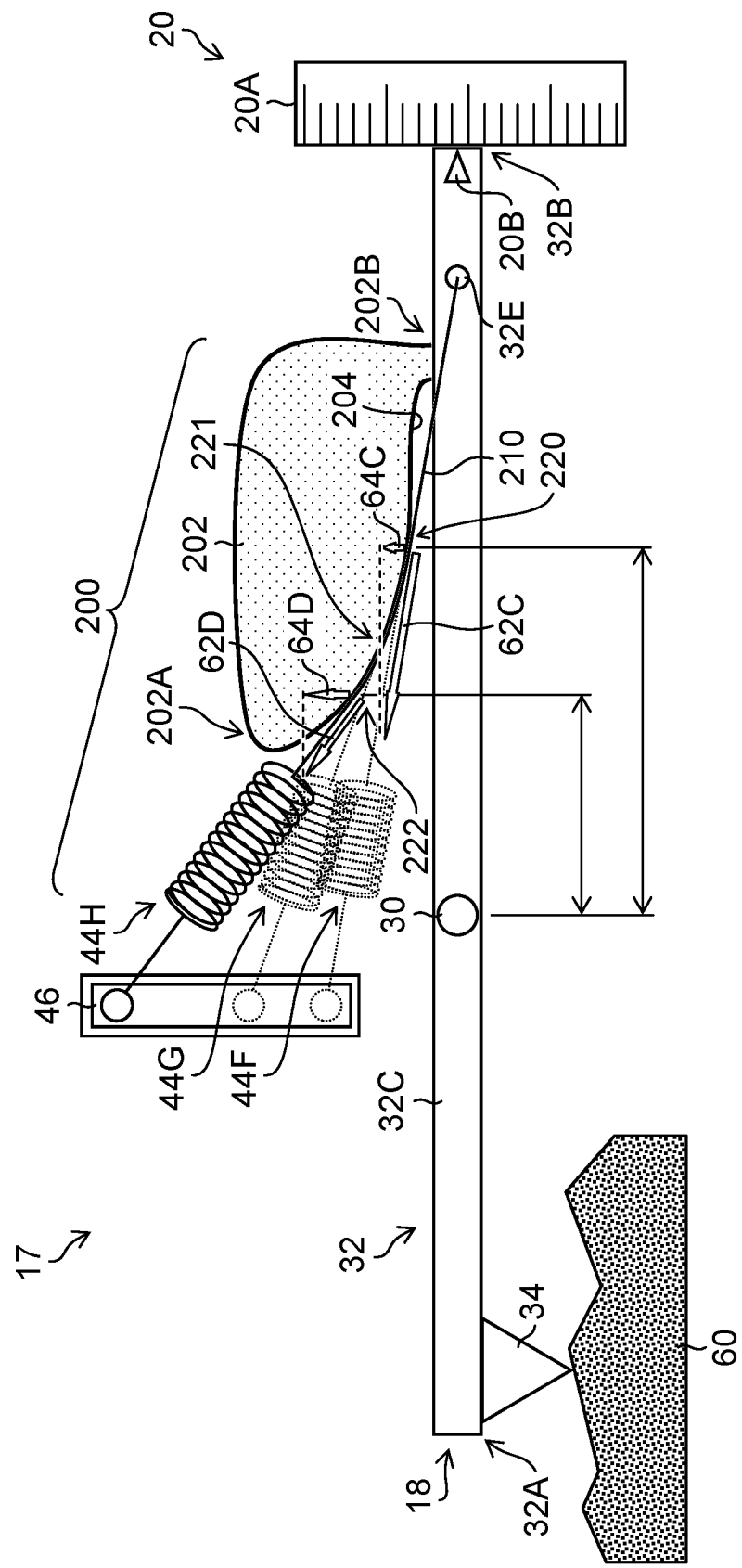
FIG. 8 is a schematic view of measuring force adjustment according to a third embodiment.

FIG. 8 is a schematic view of measuring force adjustment according to a third embodiment. In the third embodiment, a tilt adjusting part 202 including contact parts 204 is provided in place of the tilt adjusting part 50 including the contact parts 54 described in the first embodiment and the second embodiment.

The measuring force adjusting unit 200 illustrated in FIG. 8 includes the tilt adjusting part 202. The tilt adjusting part 202 includes a contact part 204 formed as a continuous surface. The curved surface can be applied to the contact part 204 arbitrarily so that the measuring force adjusting unit 200 may have a required correlation between the measuring force and the measuring force adjusting position. The contact part 204 has a curved surface along the first direction and displaces in the third direction (having displacement in the third direction). The contact part 204 is one mode of a contact part with a curved surface having an arbitrary shape.

Reference numeral 32E illustrated in FIG. 8 designates the connecting position connecting the arm 32 to a string-shaped member 210. Reference numeral 202A designates the tip end of the tilt adjusting part 202. Reference numeral 202B designates the base end of the tilt adjusting part 202.

Reference numeral 44F illustrates with broken lines, an elastic member in a state in which the string-shaped member 210 is brought into contact with a position 220 of the contact part 204, and is not brought into contact with a position 221 of the contact part 204 and a position 222 of the contact part 204. Reference numeral 62C shows an elastic force at the position 220 of the contact part 204 with an arrow. Reference numeral 64C shows the Z-axis direction component of the elastic force 62C.

Reference numeral 44G illustrates with broken lines, an elastic member in a state in which the string-shaped member 210 is brought into contact with the position 220 of the contact part 204 and the position 221 of the contact part 204 and is not brought into contact with the position 222 of the contact part 204. Illustration of an elastic force at the position 221 of the contact part 204 and the Z-axis direction component of the elastic force is omitted.

Reference numeral 44H illustrates with solid lines, an elastic member in a state in which the string-shaped member 210 is brought into contact with the position 220 of the contact part 204, the position 221 of the contact part 204, and the position 222 of the contact part 204. Reference numeral 62D shows an elastic force at the position 222 of the contact part 204 with an arrow. Reference numeral 64D shows the Z-axis direction component of the elastic force 62D.

FIG. 8 exemplifies a mode in which the point of application of the elastic force is arranged at a position on the rotation shaft 30 side with respect to the position connecting the arm 32 to the tilt adjusting part 202 (that is, on the rotation shaft 30 side as viewed from the position connecting the arm 32 to the tilt adjusting part 202). In such a mode, torque acting on the arm 32 can be reduced as compared to the mode in which the point of application of the elastic force is arranged at a position on the Z-axis direction detection sensor 20 side with respect to the position connecting the arm 32 to the tilt adjusting part 202 (that is, the Z-axis direction detection sensor 20 side as viewed from the position connecting the arm 32 to the tilt adjusting part 202).

Figure 9:
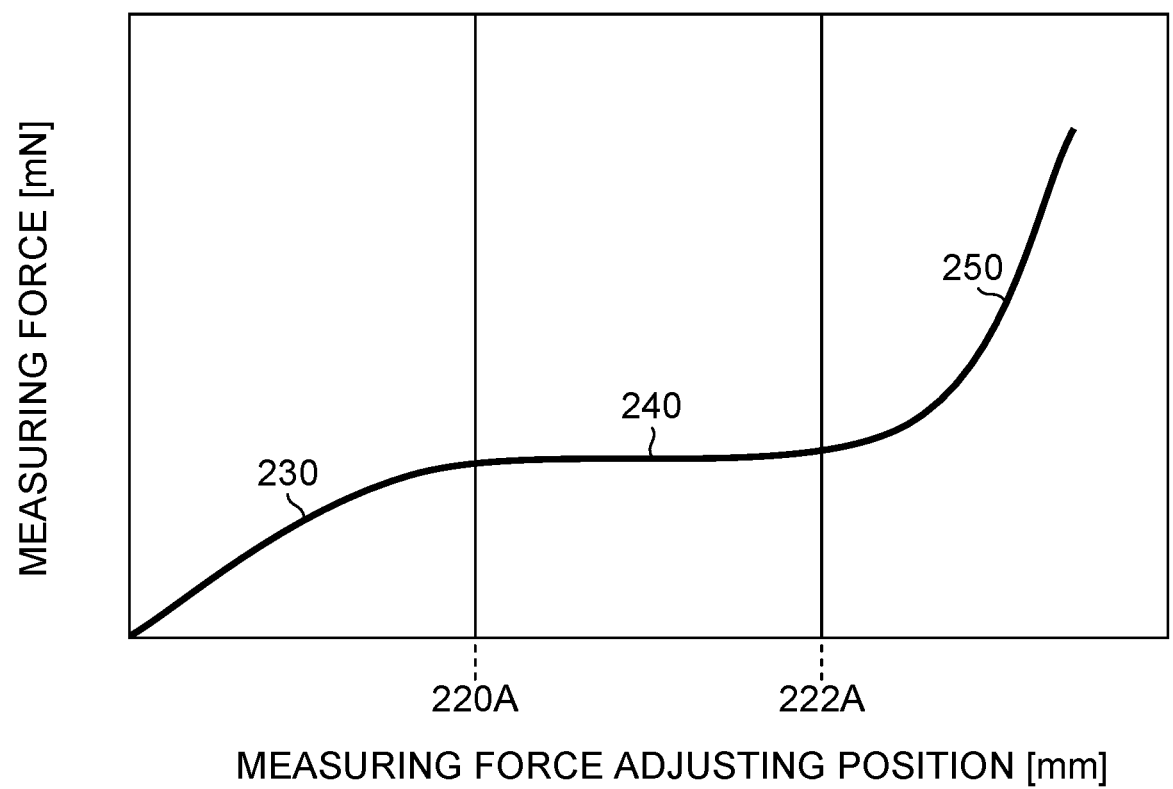
FIG. 9 is a graph for showing a relationship between a measuring force adjusting position and a measuring force in the measuring force adjustment according to the third embodiment.

The torque acting on the arm 32 is calculated by multiplying the distance from the rotation shaft 30 to the point of application of the elastic force by the Z-axis direction component of the elastic force. Because the torque acting on the arm 32 is relatively reduced, a measuring force which is flat with respect to the change of the measuring force adjusting position is easily achieved. One example of a measuring force which is flat with respect to the change of the measuring force adjusting position is shown in FIG. 9 with Reference numeral 240.

Note that, also in this embodiment, the position of the measuring force adjusting unit 200 in the X-axis direction may be arranged at a position on the Z-axis direction detection sensor 20 side than the connecting position of the tilt adjusting part 202 in the arm 32.

It is preferable that the contact part 204 illustrated in FIG. 8 employs a mode having a groove for guiding the string-shaped member 210. In such a mode, the string-shaped member 210 is prevented from coming off (being removed from) the contact part 204.

Further, it is preferable that the contact part 204 employs a mode including a rotation mechanism such as a cam follower. In such a mode, it is possible to prevent abrasion of the contact part 204 and the string-shaped member 210 which may be caused by friction between the contact part 204 and the string-shaped member 210. Those modification examples may be applied to the first embodiment and the second embodiment described above.

FIG. 9 is a graph showing a relationship between a measuring force adjusting position and a measuring force in the measuring force adjustment according to the third embodiment. The horizontal axis and the vertical axis in the graph shown in FIG. 9 are the same as those in the graphs shown in FIG. 4 and FIG. 5.

In FIG. 9, the measuring force adjusting position designated by Reference numeral 220A corresponds to a position in the Z-axis direction of the position 220 of the contact part 204 illustrated in FIG. 8. The measuring force adjusting position designated by Reference numeral 222A in FIG. 9 corresponds to a position in the Z-axis direction of the position 222 of the contact part 204 illustrated in FIG. 8.

The measuring force designated by Reference numeral 230 is a measuring force before the string-shaped member 210 illustrated in FIG. 8 is brought into contact with the position 220 of the contact part 204. A measuring force designated by Reference numeral 240 in FIG. 9 is a measuring force after the string-shaped member 210 illustrated in FIG. 8 is brought into contact with the position 220 of the contact part 204 and before the string-shaped member 210 is brought into contact with the position 222 of the contact part 204.

A measuring force designated by Reference numeral 250 in FIG. 9 is a measuring force after the string-shaped member 210 illustrated in FIG. 8 is brought into contact with the position 222 of the contact part 204. As shown in FIG. 9, the inclination of the measuring force can be changed according to the shape of the contact part 204 illustrated in FIG. 8.

<Functions and Effects of Measuring Force Adjustment According to Third Embodiment>

In the measuring force adjustment according to the third embodiment, the tilt adjusting part 202 includes the contact part 204 with which the string-shaped member 210 is brought into contact. The shape of the curved surface is arbitrarily so as to obtain a correlation between the measuring force and the displacement of the measuring force adjusting position. With respect to the arbitrary correlation, it is possible to set the shape of the curved surface and the measuring force adjusting position.

The point of application of the elastic force is arranged at a position on the rotation shaft 30 side with respect to the position connecting the arm 32 to the string-shaped member 210. As compared to the case where the point of application of the elastic force is arranged at a position on the Z-axis direction detection sensor 20 side with respect to the position connecting the arm 32 to the string-shaped member 210, the torque acting on the arm 32 can be reduced. With this configuration, it is possible to achieve the measuring force which is flat with respect to the change of the measuring force adjusting position shown in FIG. 9 with Reference numeral 240.

Such a mode is effective to finely adjust the measuring force in a case where the measuring force is determined in advance.

Although the detector applied to the surface shape measuring device is exemplified herein, the detector described herein is applicable as a detector for a surface measuring device such as a roughness measuring device, a contour measuring device, or a roundness measuring device.

In the embodiments of the present invention described above, components may be appropriately changed, added, and eliminated, without departing from the gist of the present invention. The present invention is not limited to the embodiments described above, and various modifications may be made to the present invention within the technical idea of the present invention by those who have common knowledge in this field.

REFERENCE SIGNS LIST

10 . . . surface shape measuring device, 17 . . . detector, 20 . . . Z-axis direction detection sensor, 30 . . . rotation shaft, 32 . . . arm, 34 . . . contact, 40, 100, 200 . . . measuring force adjusting unit, 42, 110, 210 . . . string-shaped member, 44, 44C, 44D, 44E, 44F, 44G, 44H . . . elastic member, 46 . . . position adjusting part, 50, 102, 202 . . . tilt adjusting part, 54, 204 . . . contact part, 60 . . . object to be measured, 104 . . . first contact part, 106 . . . second contact part

The invention claimed is:

1. A detector for a surface measuring device, comprising:
an arm including a contact at a tip end of the arm;
a rotation shaft configured to rotatably support the arm;
a transmission part having one end which is connected to the arm at a position on a side opposite to the contact, with respect to the rotation shaft;
an elastic part having one end connected to another end of the transmission part, the elastic part configured to generate a measuring force to be applied to the contact;
a position adjusting part connected to another end of the elastic part, the position adjusting part configured to move a position of the another end of the elastic part in a moving direction having components of a first direction being a longitudinal direction of the arm and a third direction orthogonal to a second direction being a direction of the rotation shaft; and
a tilt adjusting part connected to the arm, the tilt adjusting part including a contact part arranged at a position where the contact part can be brought into contact with the transmission part when the position of the another end of the elastic part is moved in the moving direction.

2. The detector for a surface measuring device according to claim 1, wherein the transmission part is a member having non-elasticity or a member having an elastic modulus smaller than an elastic modulus of the elastic part.

3. The detector for a surface measuring device according to claim 1, wherein
the transmission part is bent when the position of the another end of the elastic part is moved in the moving direction in a state in which the transmission part is brought into contact with the contact part, and
the transmission part is not bent in a state in which the transmission part is not brought into contact with the contact part.

4. The detector for a surface measuring device according to claim 1, wherein the contact part is arranged at a position which is separated from a connecting position connecting the arm to the transmission part in the first direction by a certain distance, and separated from a position of the arm in the third direction by a certain distance.

5. The detector for a surface measuring device according to claim 1, further comprising
a plurality of the contact parts which differ in position in the first direction and position in the third direction, from each other.

6. The detector for a surface measuring device according to claim 1, wherein the contact part includes a curved surface which extends along the first direction and has an arbitrary shape with displacement in the third direction.

7. The detector for a surface measuring device according to claim 1, wherein the contact part is arranged at a position on a side opposite to the rotation shaft as viewed from the connecting position connecting the arm to the transmission part, in the first direction.

8. The detector for a surface measuring device according to claim 1, wherein the contact part is arranged at a position on the rotation shaft side as viewed from the connecting position connecting the arm to the transmission part, in the first direction.

9. The detector for a surface measuring device according to claim 1, further comprising
a detection unit configured to detect displacement of the another end side of the arm in the third direction.

* * * * *